(12) United States Patent
Kalhan et al.

(10) Patent No.: US 9,467,880 B2
(45) Date of Patent: Oct. 11, 2016

(54) MANAGEMENT OF DEVICE-TO-DEVICE DISCOVERY SIGNALS AND SMALL CELL DISCOVERY SIGNALS

(71) Applicant: KYOCERA Corporation, Kyoto (JP)

(72) Inventors: Amit Kalhan, San Diego, CA (US); Henry Chang, San Diego, CA (US); David Comstock, San Diego, CA (US); Douglas Dunn, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 126 days.

(21) Appl. No.: 14/317,834

(22) Filed: Jun. 27, 2014

(65) Prior Publication Data

US 2015/0003287 A1 Jan. 1, 2015

Related U.S. Application Data

(60) Provisional application No. 61/841,056, filed on Jun. 28, 2013.

(51) Int. Cl.
*H04J 3/06* (2006.01)
*H04W 24/08* (2009.01)
*H04W 8/00* (2009.01)
*H04W 72/04* (2009.01)
*H04W 76/02* (2009.01)
*H04W 16/32* (2009.01)

(52) U.S. Cl.
CPC ............. *H04W 24/08* (2013.01); *H04W 8/005* (2013.01); *H04W 16/32* (2013.01); *H04W 72/042* (2013.01); *H04W 76/023* (2013.01)

(58) Field of Classification Search
CPC . H04W 24/08; H04W 8/005; H04W 72/042; H04W 76/023; H04W 16/32
USPC ........................................ 370/254, 503, 512
See application file for complete search history.

(56) References Cited

U.S. PATENT DOCUMENTS

| 8,976,690 B2 * | 3/2015 | Akyildiz ............. H04L 41/5025 370/252 |
| 2014/0003301 A1 * | 1/2014 | Madan ................ H04W 72/042 370/280 |
| 2014/0105083 A1 * | 4/2014 | Krishnaswamy ..... H04W 40/22 370/311 |
| 2014/0187283 A1 * | 7/2014 | Nimbalker .......... H04W 72/048 455/550.1 |

* cited by examiner

*Primary Examiner* — Phuc Tran

(57) ABSTRACT

Small cell discovery signals are transmitted within a subframe allocated for transmission of Device-to-Device (D2D) discovery signals. In accordance with a communication standard, communication resources are organized into frames having subframes for communication within a cellular communication system. Wireless service is provided to mobile UE devices in different sized cells that may overlap. In addition, at least some mobile UE devices can communicate with each other using D2D communication resources. D2D discovery signals are transmitted by mobile UE devices to facilitate the discovery of the mobile UE devices by other mobile UE devices. The communication standard allocates one or more subframes within a frame of a frequency defined communication resource for transmission of the D2D discovery signals. The small cell discovery signals are also transmitted within the subframe to facilitate recognition that a small cell mobile UE device is within the small cell service area.

22 Claims, 6 Drawing Sheets

MANAGEMENT OF DEVICE-TO-DEVICE DISCOVERY SIGNALS AND SMALL CELL DISCOVERY SIGNALS

CLAIM OF PRIORITY UNDER 35 U.S.C. §119

The present application claims priority to Provisional Application No. 61/841,056 entitled "UNIVERSAL DISCOVERY SIGNAL FOR D2D AND THE SMALL CELLS,", filed JUN. 28, 2013, assigned to the assignee hereof and hereby expressly incorporated by reference in its entirety.

FIELD

This invention generally relates to wireless communications and more particularly to management of device-to-device (D2D) discovery signals and small cell discovery signals.

BACKGROUND

Many wireless communication systems use communication stations (base stations, eNodeBs, eNBs) to provide geographical service areas where wireless communication user equipment devices (UE devices) communicate with the communication station providing the particular geographical service area in which the UE devices are located. The communication stations are connected within a network allowing communication links to be made between the wireless communication devices and other devices. The communication system may include communication stations that provide overlapping service areas of different sizes to serve various needs of mobile UE devices. For example, macrocell communications stations may provide macrocell service areas that are larger and may cover one or more small cell service areas provided by small cell communication stations.

In some circumstances, the communication links are between wireless communication UE devices that are close to each other. In these situations, it may be preferred to have a direct communication link between the two wireless UE devices rather than communicating through a base station. Such direct communication between devices is often referred to as device-to-device (D2D) communication or peer-to-peer (P2P) communication. D2D discovery signals are transmitted to allow D2D mobile devices to discover other D2D mobile devices that may be candidates for D2D communication. The discovery signals are transmitted at times and frequencies typically designated by a communication specification.

SUMMARY

Small cell discovery signals are transmitted within a subframe allocated for transmission of Device-to-Device (D2D) discovery signals. In accordance with a communication standard, communication resources are organized into frames having subframes for communication within a cellular communication system. Wireless service is provided to mobile UE devices in different sized cells that may overlap. In addition, at least some mobile UE devices can communicate with each other using D2D communication resources. D2D discovery signals are transmitted by mobile UE devices to facilitate the discovery of the mobile UE devices by other mobile UE devices. The communication standard allocates one or more subframes within a frame of a frequency defined communication resource for transmission of the D2D discovery signals. The small cell discovery signals are also transmitted within the subframe to facilitate recognition that a small cell mobile UE device is within the small cell service area.

DETAILED DESCRIPTION

Figure 1:
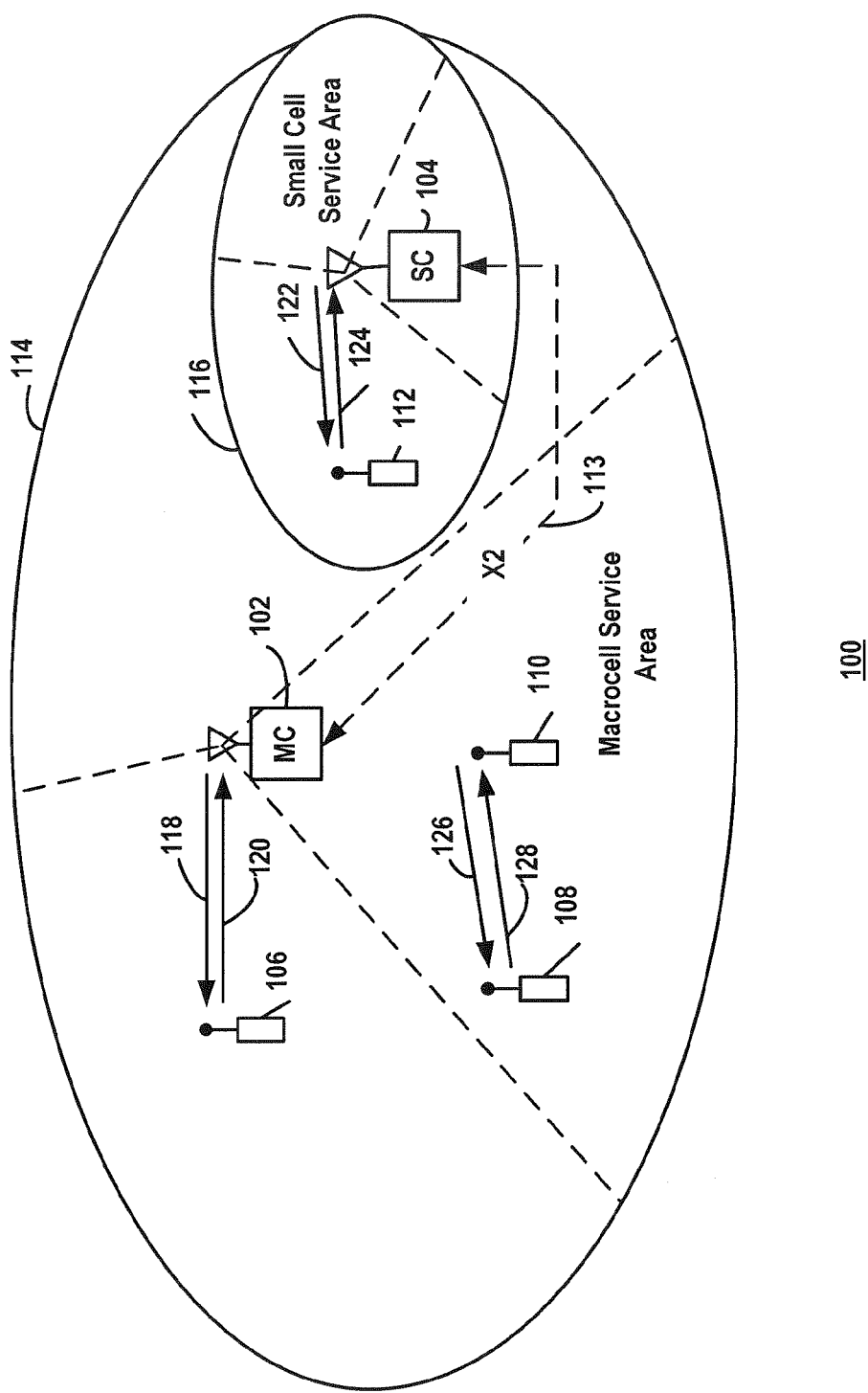
FIG. 1 is a block diagram of a communication system that includes macrocell communication stations and small cell communication stations that serve user equipment devices (UE devices) in services areas provided by the communication stations.

FIG. 1 is a block diagram of communication system 100 that includes macrocell communication stations 102 and small cell communication stations 104 that serve user equipment devices (UE devices) 106, 108, 110, 112 in service areas 114, 116 provided by the communication stations 102, 104. Several macrocell communication stations are typically interconnected through a backhaul (not shown in FIG. 1) and to a network controller (not shown in FIG. 1) to provide several service areas to cover large geographical areas. In some situations, the small cell communication stations may also be connected to the macrocell network through the backhaul and/or may be connected to each other through another backhaul. The backhaul may include any combination of wired, optical, and/or wireless communication channels. For the examples herein, the network controller includes the functionality of the Mobility Management Entity (MME) and the Packet Gateway (P-GW). In some situations where the small cell communication station 104 is connected through a backhaul to the macrocell communication station 102, the small cell communication station 104 is connected to the macrocell communication station 102 through an X2 communication link 113. In other situations, the connection is not available. As a result, the X2 communication link is illustrated with a dashed line to indicate that the connection may or may not be available.

The communication stations 102, 104 may also be referred to as base stations, access points, access nodes, eNodeBs, and eNBs among other terms. The macrocell communication station 102 can provide wireless service to UE devices within the macrocell service area 114 and the small cell communication station 104 can provide wireless service within the small cell service area 116 which at least partially overlaps with the macrocell service area 114. Communication resources are managed and assigned to avoid, or at least minimize, interference.

A cellular communication system is typically required to adhere to a communication standard or specification. The communication specification defines at least a data channel and a control channel for uplink and downlink transmissions and specifies at least some timing and frequency parameters for physical downlink control channels from a base station to a wireless communication device. The Third-Generation Partnership Project Long-Term Evolution (3GPP LTE) communication specification is a specification for systems where communication stations (eNodeBs) provide service to wireless communication devices (UE devices) using orthogonal frequency-division multiplexing (OFDM) on the downlink and single-carrier frequency-division multiple access (SC-FDMA) on the uplink. Although the techniques described herein may be applied in other types of communication systems, the exemplary systems discussed herein operate in accordance with a 3GPP LTE communication specification that may be a specification adopted after the filing of this application.

For the examples herein, therefore, the macrocell communication station 102 includes a wireless transceiver that transmits downlink signals 118 to one or more UE devices 106 within the macrocell service area 114 in accordance with 3GPP LTE and receives uplink signals 120 from one or more UE devices 106 within the macrocell service area 114 in accordance with 3GPP LTE. The small cell communication station 104 includes a wireless transceiver that transmits downlink signals 122 to one or more UE devices 112 within the small cell service area 116 in accordance with 3GPP LTE and receives uplink signals 124 from one or more UE devices 112 within the small cell service area 116.

The UE devices 106, 108, 110, 112 may be referred to as mobile devices, wireless devices, wireless communication devices, mobile wireless devices, and User Equipment (UEs), as well as by other terms. The UE devices include electronics and code for communicating with communication stations (eNBs) and, in some cases, with other devices including other UE devices. At least some of the UE devices are capable of device-to-device (D2D) communication and referred to herein as D2D UE devices. Two D2D UE devices 108, 110 are shown engaged in D2D communication in the example of FIG. 1 where each D2D UE device 108, 110 transmits D2D signals 126, 128.

The UE devices 106, 108, 110, 112 include devices such as cell phones, smart phones, personal digital assistants (PDAs), wireless modem cards, wireless modems, tablets with wireless communications electronics, and laptop and desktop computers, as well as other devices. The combination of wireless communication electronics with an electronic device, therefore, may form a UE device. For example, a wireless communication device may include a wireless modem connected to an appliance, computer, or television.

The small cell communication stations 104 typically use frequencies different from the macrocell frequencies used by the macrocell communication stations 102. The macrocell communication resources include downlink communication resources for downlink communication from a communication station to UE devices and uplink communication resources for uplink transmissions from the UE devices to the communication station. The uplink communication resources are different from the downlink communication resources. Some of the macrocell communication resources are assigned to device-to-device (D2D) communication between two D2D UE devices 108, 110 as needed. The communication resources assigned for D2D communication are not used for macrocell communication by macrocell communication stations near the D2D UE devices using the resources. For example, if the communication resources are time-frequency communication resources, the time segments and frequency bands (e.g., sub-carriers) assigned to the D2D communication link are not used by the macrocell communication station. If uplink macrocell communication resources are assigned for D2D communication, the resources are assigned such that interference to other D2D communication and to uplink communication in adjacent cells, as well as the same cell, is minimized. Examples of suitable techniques for managing macrocell resources for D2D communication are discussed in Patent Application Serial Number PCT/US2012/064711, entitled "DEVICE TO DEVICE COMMUNICATION MANAGEMENT USING MACROCELL COMMUNICATION RESOURCES," filed on Nov. 12, 2012, and incorporated by reference in its entirety herein.

Figure 2:
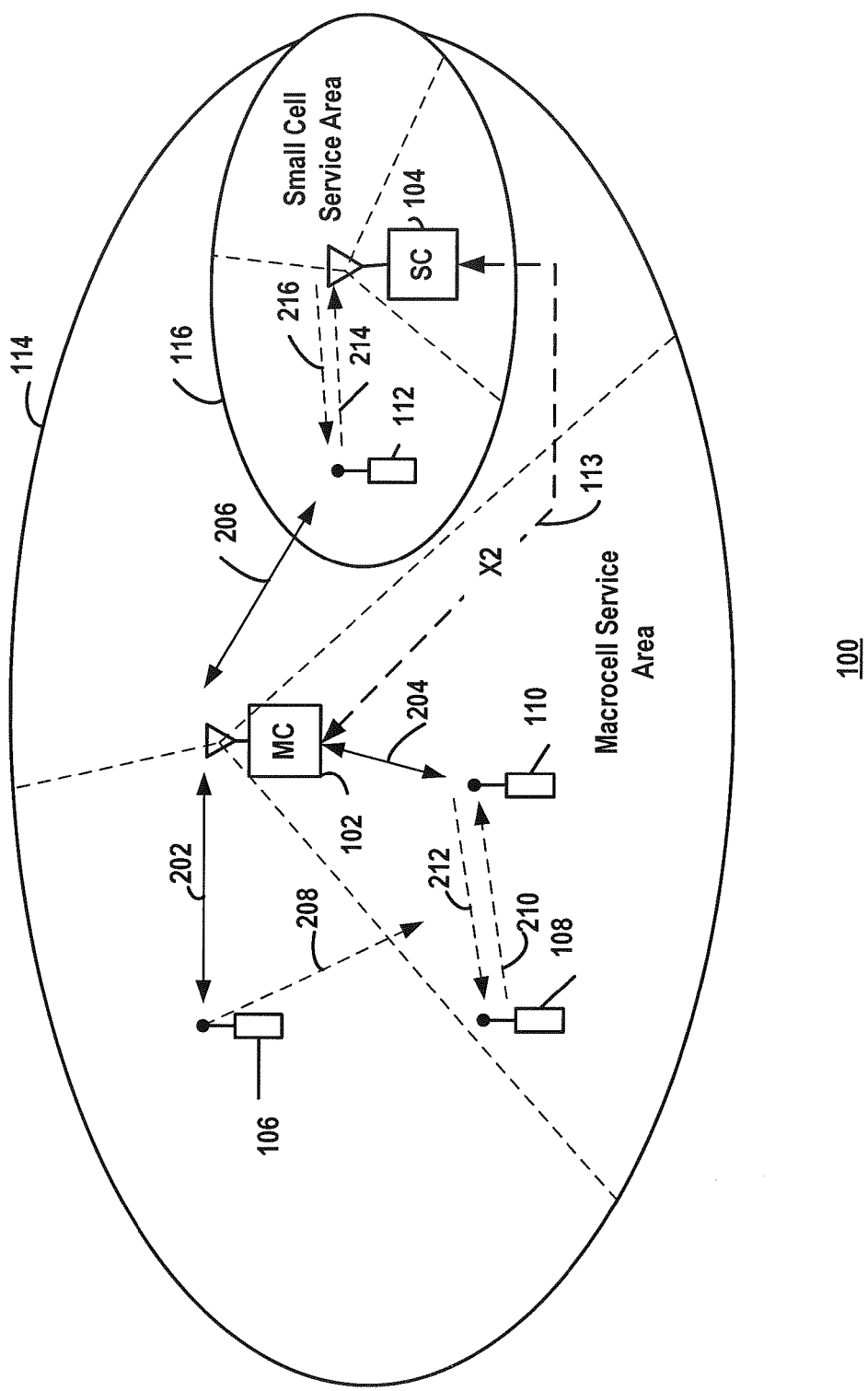
FIG. 2 is a block diagram of the communication system for an example where UE devices are transmitting discovery signals.

FIG. 2 is a block diagram of the communication system for an example where UE devices 106, 108, 110, 112 are transmitting discovery signals. The UE devices transmit D2D discovery signals depending on the capabilities of the particular device and the situation. The example of FIG. 2 is an illustration of one of numerous situations where some or all UE devices within a service area are transmitting discovery signals.

In order to facilitate discovery of D2D UE devices, macrocell communication resources are allocated for transmission of D2D discovery signals by the communication specification. Specific resources may be assigned to particular devices by a scheduler or other entity in the communication network. A D2D discovery signal allows one or more D2D devices to be discovered by one or more other D2D devices. The transmitting D2D device transmits a D2D discovery signal using the allocated communication resources for D2D discovery signals while monitoring the D2D discovery signal communication resources. After a D2D device detects a D2D discovery signal, the receiving D2D device may respond to or otherwise acknowledge the received discovery signal to initiate a communication session with the transmitting D2D device. In some circumstances, the D2D device does not respond to (or ACK) a detected discovery signal. In some cases, for example, the D2D device detects the discovery signal and becomes aware of another D2D device. Only when needed, the D2D device initiates communication by sending a request to the macrocell eNB. In another example, after detecting a discovery signal the UE device can update an Application ("App") such as Facebook, Twitter, etc. where the presence of a discovered UE is shown. For the examples discussed below, uplink macrocell communication resources are assigned for D2D discovery signal transmission. In some situations, downlink macrocell communication resources, or a combination of downlink and uplink macrocell resources, can be used for D2D discovery signals. A communication specification, such as the 3GPP LTE communication specification, specifies the macrocell communication resources that can be used for the transmission of D2D discovery signals. In addition, the communication specification defines frames and subframes of time-frequency communication resources. The frames and subframes can be synchronized across multiple frequency carriers in implementations. Each carrier contains subcarriers that are further divided in time. Accordingly, as discussed below, each subframe of a frequency carrier includes several time-frequency communication resources blocks. One or more subframes are allocated for D2D discovery signal transmission by the communication specification where the particular communication resource blocks may be assigned by the communication system.

For the examples herein, the subframes allocated for D2D discovery signal transmission are also used for transmission of small cell discovery signals. In certain situations, UE devices do not have information regarding the presence of nearby small cell service areas and a small cell communication station does not have information regarding the presence of the nearby UE devices. In particular, if the small cell is operating on a different carrier frequency than the UE's serving cell (macrocell) carrier frequency, the UE may not be able to autonomously determine the presence of the small cell. Transmission of discovery signals by the UE devices and/or the small cell communication stations enable recognition that a UE device (small cell UE device) is within the small cell service area. As discussed below, the time-frequency resource blocks may be assigned within the discovery subframe such that the station discovery signals transmitted from the small cell communication station in one portion (time slot) of the subframe and UE discovery signals are transmitted from the UE devices within a second portion (time slot) of the subframe. In other examples, both UE discovery signals and station discovery signals are assigned (scheduled) for transmission throughout the entire discovery subframe.

For the example of FIG. 2, the first UE device, second UE device, and the third UE device are at least receiving downlink control signals from the macrocell communication station 102 and, in most situations, are served by the macrocell communication station 102. Accordingly, FIG. 2 shows communication links 202, 204, 206 between the macrocell communication station 102 and the first UE device 106, second UE device 108, and third UE device 110. The situation depicted in FIG. 2 is an example of the system of FIG. 1 before the fourth UE device 112 has established communication with the small cell communication station 104 and before the D2D UEs 108, 110 have established D2D communication with each other.

The first UE device 106 transmits a D2D discovery signal 208, the second UE device 108 transmits a D2D discovery signal 210, the third UE device 110 transmits a D2D discovery signal 212, and the fourth UE device 112 transmits a D2D discovery signal 214. The D2D device signals may be transmitted within the same time portion of a subframe or within a different portion. As discussed below, for example, the UE devices 106, 108, 110, 112 may be divided into different groups where each group has a dedicated portion of a subframe for transmitting discovery signals. In some cases, only one UE device belongs to a group. In this case the discovery signals are allocated to an individual UE device or the individual UE may be considered not assigned to a group.

The discovery signal 214 transmitted by the fourth UE device 112 is detected by the small cell communication station 104 when the fourth UE device 112 is sufficiently close to the small cell communication station 104. Accordingly, for the examples herein, all discovery signals transmitted by the UE devices are D2D discovery signals even though a discovery signal can be used for detection by communication stations. For the example, the D2D discovery signals 208, 210, 212, 214 are transmitted using macrocell uplink subcarriers.

The small cell communication station 104 transmits a small cell discovery signal 216 within the discovery subframe. Although the small cell discovery signals 216 are transmitted within the same subframes as the D2D discovery signals 208, 210, 212, 214, the subframe may be divided into portions where D2D devices are allocated one portion and the small cell communication stations 104 are allocated another portion. For example, discovery signal transmission from the small cell communication station 104 may be within a first time slot and discovery signal transmission from the UE devices may be within a second time slot of the same subframe.

In one example, the transmission of a small cell discovery signal 216 is in response to a detection of a D2D discovery signal. In other situations, the small cell discovery signals 216 may be transmitted periodically regardless of whether a D2D discovery signal has been detected. In conventional systems, small cell communication stations transmit Primary and Secondary Synchronization Signals (PSS/SSS) and/or other reference signals (for example, PSS/SSS/CRS) to facilitate detection of the communication station by UE devices. The discovery signal management techniques described herein allow for modification of the PSS/SSS transmissions where the modifications may include transmitting the PSS/SSS (or other synchronization reference) signals only in certain situations and/or changing the period of transmission. The discovery signal management techniques and the PSS/SSS modifications increase efficiency and decrease power consumption by the small cell communication station and the UE devices.

One technique for managing the small cell discovery signals and PSS/SSS includes refraining from transmitting discovery signals and PSS/SSS until a D2D discovery signal is detected. The trigger to transmit the small cell discovery signal may be based solely on the detection of D2D discovery signals or may be based on other criteria. A determination may be made regarding the proximity of the UE device transmitting the D2D discovery signal and the small cell discovery signal may only be transmitted if the D2D UE device is sufficiently close. In addition, the PSS/SSS may also be transmitted when the D2D device is sufficiently close to the small cell communication station. The criteria used to determine whether to transmit the discovery signal and/or the PSS/SSS may include a determination of whether a UE device should receive service from the small cell communication station.

Another technique for transmitting the small cell discovery signals includes transmitting the small cell discovery signal at a relatively long period. The small cell communication station may refrain from transmitting one or more of PSS/SSS/CRS (or increase the period of transmission) and enter deep sleep cycles where the small cell discovery signal is transmitted every few seconds, for example. Therefore, the small cell communication station may transmit discovery signals even when no D2D discovery signal has been received from the UE device. This could reduce power consumption of the UE devices even when the UE devices are only monitoring discovery signals and not transmitting discovery signals. The UE device will only need to monitor F2 (with discovery signal) and not F3 (with PSS/SSS) to detect the presence of the small cell communication station. In situations, where the period of transmission of the synchronization signal is increased (i.e., the frequency of retransmission is decreased), the period can be decreased in response to detecting a D2D discovery signal.

Various modifications and combinations of the techniques discussed above as well as other techniques may be used to manage the transmissions of the discovery signals and PSS/SSS.

Limited transmission of PSS/SSS from the small cell communication stations decreases power consumption by the small cell communication stations. UE devices also consume less power when searching for small cell discovery signals instead of PSS/SSS. If it is decided that the small cell communication station will refrain from transmitting PSS/SSS until a D2D signal is detected, or if the PSS/SSS is transmitted a different periodicity than the conventional period, the UE device should be informed of this modification by the serving cell (macrocell). Since the UE device already searching for D2D discovery signals, the UE device can avoid tuning to the frequency used by small cell communication station thereby saving power. The UE device can still detect the presence of the small communication station since the small cell discovery signals are transmitted within the same subframe as the D2D discovery signals.

Figure 3:
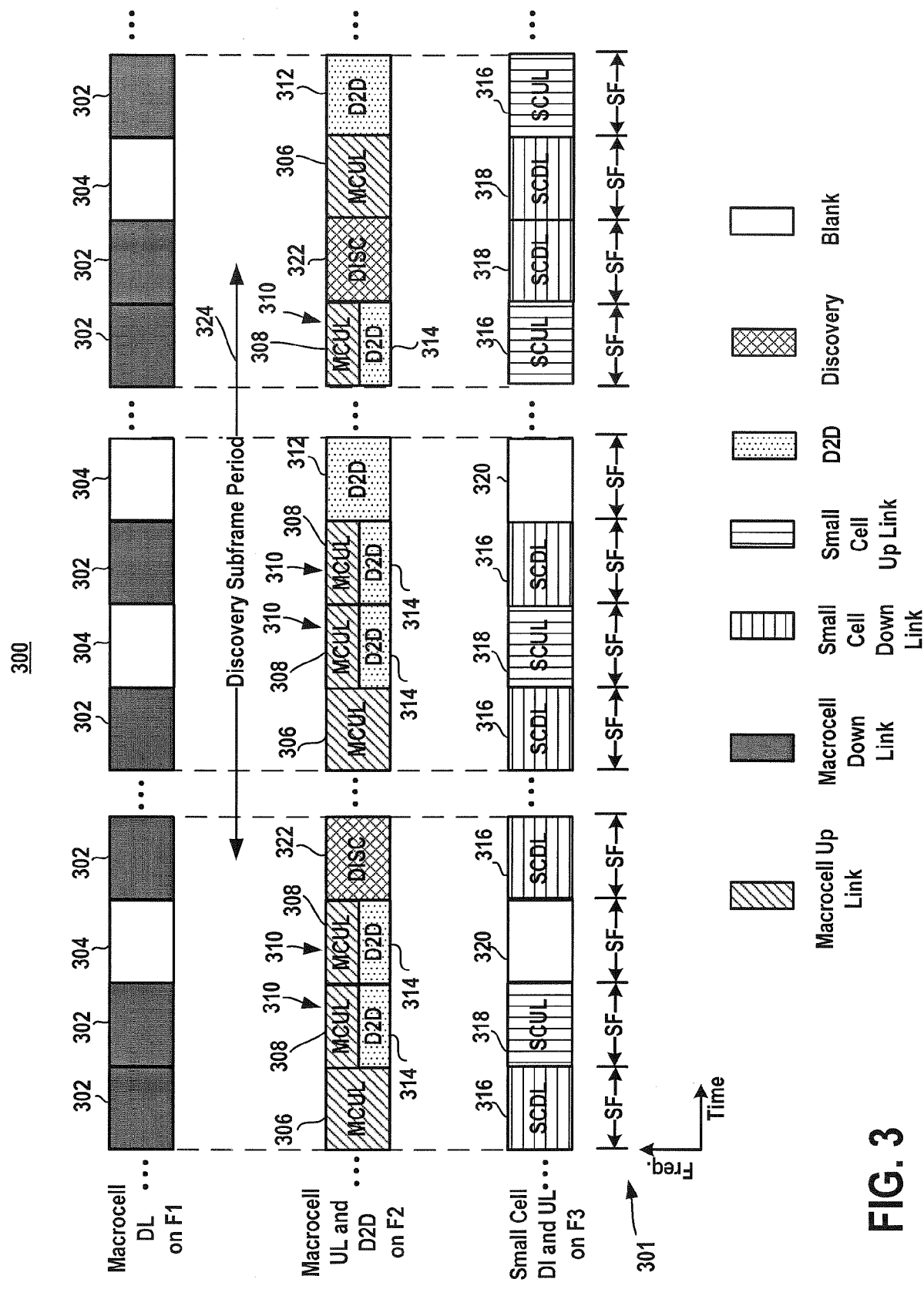
FIG. 3 is a time-frequency chart of transmission subframes for an example where D2D discovery signal transmissions are assigned to a macrocell uplink frequency.

FIG. 3 is a time-frequency chart 300 of transmission subframes for an example where D2D discovery signal transmissions are assigned to a macrocell uplink frequency. The frequency and timing allocation in FIG. 3 is just one example of numerous possible implementations. The D2D discovery signal transmissions, for example, may be assigned to the macrocell downlink frequency in some situations. For the example of FIG. 3, the macrocell communication station transmits downlink signals on a first carrier (F1) and receives uplink signals on a second carrier (F2). Typically, F1 and F2 may be considered as the frequency carrier pairs in an FDD configuration. The small cell communication station 104 transmits downlink signals and receives uplink signals on a third carrier (F3) using TDD. The communication system adheres to a timing arrangement where time is divided into frames and where each frame has several subframes 301. For LTE, each 10 ms frame includes 10 subframes, where each subframe is divided into two time slots. Each carrier includes subcarriers where each subframe is further divided into time blocks to define several time-frequency communication resource blocks.

The macrocell communication station 102 transmits downlink signals 118 to UE devices within the macrocell service area using communication resources of the macrocell downlink transmission subframes 302 and does not transmit during the other subframes 304. UE devices within the macrocell service area transmit uplink macrocell signals to the macrocell communication station using communication resources within the macrocell uplink transmission subframes 306 and within macrocell uplink portions 308 of shared subframe 310. Some macrocell uplink subframe 312 and portions 314 of some macrocell uplink subframe 310 are allocated for D2D communication. Accordingly, subframe 310 includes a macrocell uplink portion 308 and a D2D portion 314. Although FIG. 3 shows the macrocell uplink portion 308 as including the higher frequency subcarriers on the F2 carrier and the D2D portion 314 including the lower frequency subcarriers, the portions 308, 314 can be allocated in different ways For the example of FIG. 3, the small cell communication station 104 transmits downlink signals to UE devices within the small cell service area 116 within downlink subframes 316 and receives uplink signals within the uplink subframes 318. The small cell communication station, therefore, uses TDD in the example. Other types of communication techniques may be used by the small cell communication station 104 in some circumstances. Small cell communication station uses a third frequency carrier, F3, for communication in the example of FIG. 3. Subframes 320 that do not contain small cell communication are shown as clear blocks in the figure.

In addition to the allocation of the D2D subframes 312, macrocell uplink transmission subframes 306, and shared subframes 310, a discovery subframe 322 is allocated on the second carrier, F2. As discussed below with reference to FIG. 4, a set of communication resources of the discovery subframe are allocated for transmission of D2D discovery signals and another set of communication resources are assigned for the transmission of small cell discovery signals. The discovery subframe period 324 is selected such that it is sufficiently short to facilitate device discovery while being sufficiently long to minimize power consumption by the UE devices and small cell communication stations. An example of a suitable discovery subframe period is 1000 ms. Longer and shorter periods, however, may be used in some circumstances based on system requirements.

Figure 4:
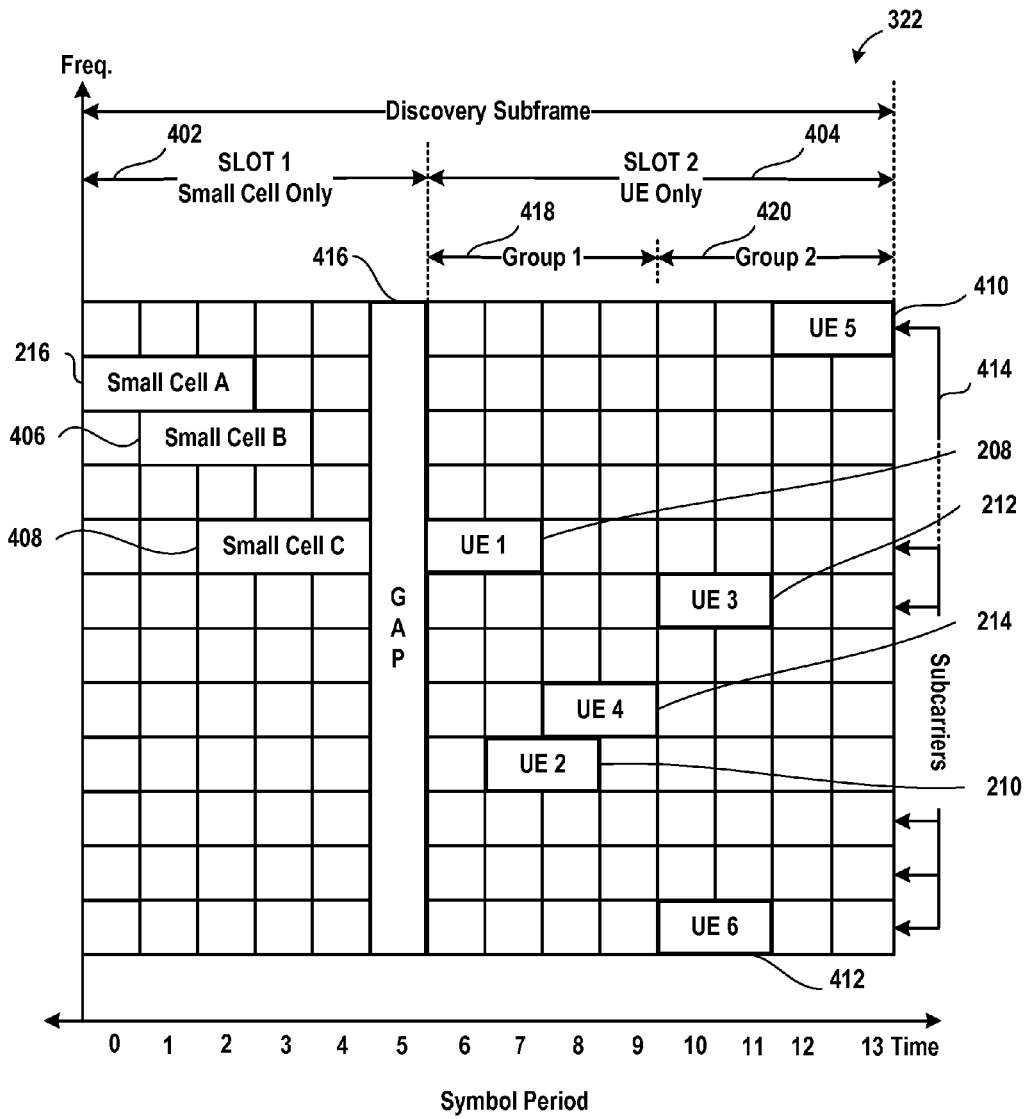
FIG. 4 is an illustration of an example of a discovery subframe where a first time slot of the subframe is allocated for transmission of small cell discovery signals and a second time slot is allocated for transmission of D2D discovery signals.

FIG. 4 is an illustration of an example of a discovery subframe 322 where a first time slot 402 of the subframe 322 is allocated for transmission of small cell discovery signals and a second time slot 404 is allocated for transmission of D2D discovery signals by UE devices. FIG. 4 is an example of a situation where three small cell communication stations are transmitting small cell discovery signals 216, 406, 408 and six UE devices are transmitting D2D discovery signals 208, 210, 212, 214, 410, 412. The subframe 322 includes 12 subcarriers 414 having 14 symbol periods where four (symbol periods 0-4) are allocated for the first time slot 402 and eight (symbol periods 6-13) are allocated for the second time slot 404. A gap 416 or guard band is also provided between the two time slots 402, 404 at symbol period 5. The subframe 322 can be divided in different ways depending on the particular circumstances. In many situations, more resources are allocated for D2D discovery signals because of the relatively larger number of UE devices as compared to small cell communication stations found in the geographical area.

For the example of FIG. 4, the symbol periods of the second time slot are assigned to two groups of UE devices. D2D discovery signals 208, 210, 214 transmitted with the first group of symbol periods 418 and D2D discovery signals 212, 410, 412 transmitted with the second group of symbol periods 420. Briefly referring to FIG. 2, therefore, the second UE device transmits it's D2D discovery signal 210 in the first group 418 and the third UE device it's D2D discovery signal 212 in the second group 420. Organizing the D2D discovery signal transmissions into groups may be useful because of full duplex constraints and to further stagger the transmissions. In some circumstances, the UE devices are not assigned to groups.

For the example, small cell discovery signals 216, 406, 408 are transmitted from three small cell communication stations within the first time slot 402 of the same subframe 322 where D2D discovery signals 208, 210, 212, 214, 410, 412 are transmitted in the second time slot 404. In some situations, the D2D discovery signals and small cell discovery signals can be transmitted throughout the entire subframe 322. Also, the small cell discovery signals and the D2D discovery signals may have different or the same physical formats. Therefore, the discovery signals may include any number of symbol periods.

The discovery signal resources may be assigned in any of several ways. For example the specific discovery signal resources may be assigned to specific UE devices by a scheduler in the network. In some situations, the scheduler may provide a set of resources and a hopping sequence to each UE device. In other situations, the UE devices may randomly access the allocated resources within the symbol period group, time slot, and/or discovery subframe 322. Resources for small cell discovery signals may also be assigned using any of several techniques. In the example herein, the small cell discovery signal resources are assigned by the macrocell eNB or the network.

Figure 5:
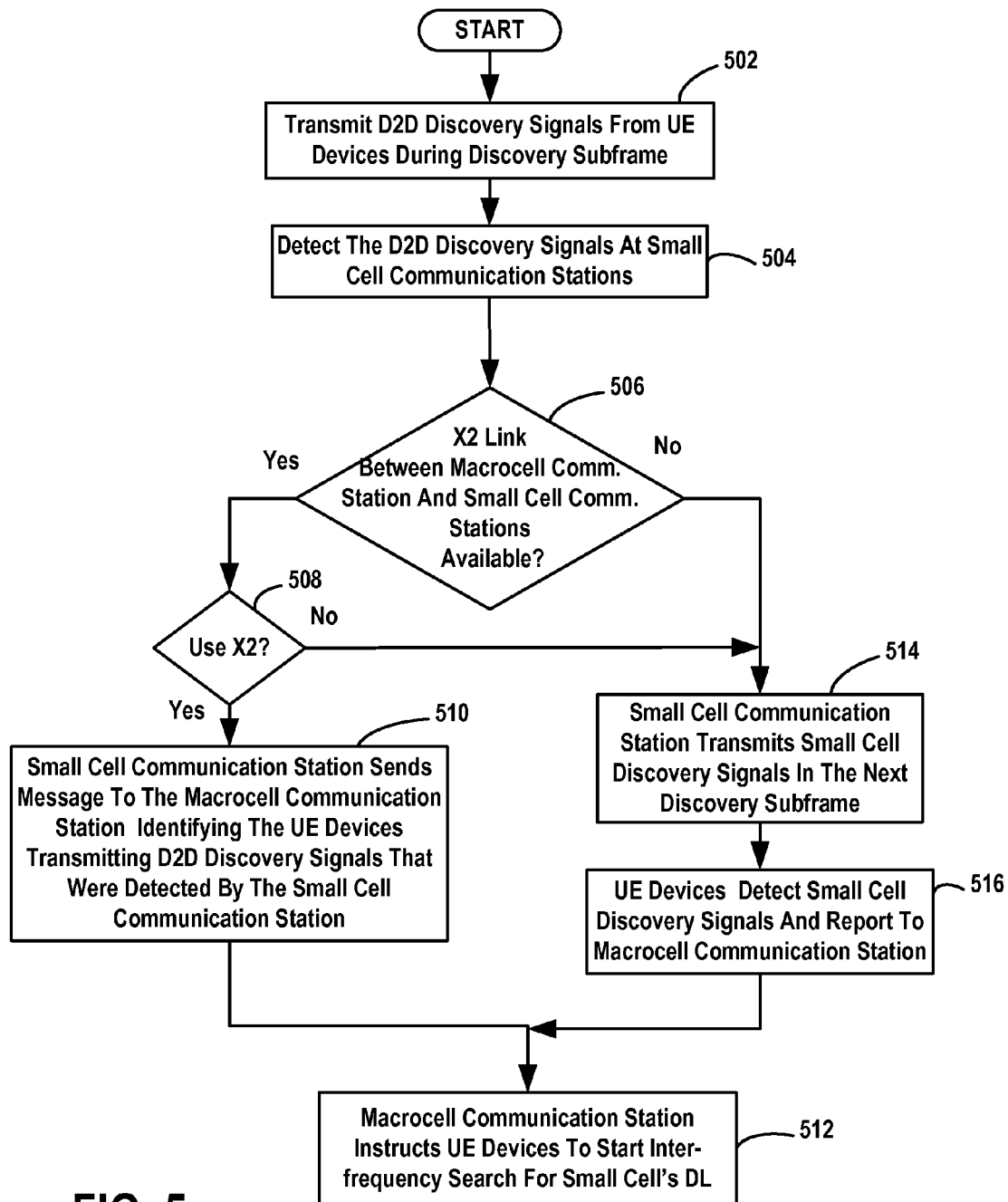
FIG. 5 is a flow chart of an example of a method of managing discovery signal transmissions.

FIG. 5 is a flow chart of an example of a method of managing discovery signal transmissions.

At step 502, the UE devices transmit D2D discovery signals in the discovery subframe. As discussed above, the UE devices transmit the D2D discovery signals in accordance with the communication specification and any instructions provided by the scheduler using the communication resources within the discovery subframe 322.

At step 504, the D2D discovery signals are detected by the small cell communication stations and by UE devices that are sufficiently close to the UE devices transmitting the D2D discovery signals. For the examples, herein, the D2D discovery signals include the identity of the UE device. Examples of the identity of the UE device include the D2D UE ID and the C-RNTI of the UE device.

At step 506, the small cell communication stations determine whether an X2 link exists between the macrocell communication station and the small cell communication station. If an X2 link exists, the method continues at step 508. Otherwise, the method continues at step 514.

At step 508, the small cell communication station determines whether the X2 link should be used to communicate with the macrocell communication station. In some situations, X2 may not be available for use even though the X2 link exists. If the X2 messaging for the transfer of D2D discovery information is available, then the X2 link will be used and the method continues at step 510; Otherwise, the method continues at step 514.

At step 510, the small cell communication station sends a message to the macrocell communication station identifying the UE devices that were detected by detecting their D2D discovery signals. The UE devices may be identified with a unique identifier, such as the UE device's UE ID or C-RNTI.

At step 512, the macrocell communication station instructs the UE devices to start an inter-frequency search for the small cell communications stations downlink signals. The instructions include the carrier-frequency, cell-ID, etc. that help the UE to detect the PSS/SSS transmitted by the small cell eNB. The macrocell communication station will also provide the UE with measurement gaps in order to allow the UE device to temporarily tune to the small cell communication station's carrier frequency. It is assumed that the UE device may not be equipped with multiple receivers to receive signals on two frequency carriers simultaneously.

If an X2 link is not used to communicate with the macrocell communication station, the method continues at step 514 where the small cell communication station transmits small cell discovery signals in the next discovery subframe.

At step 516, the UE devices sufficiently close to the small cell communication station detect the small cell discovery signals and report the detection to the macrocell indication station. The method then continues at step 512.

Figure 6:
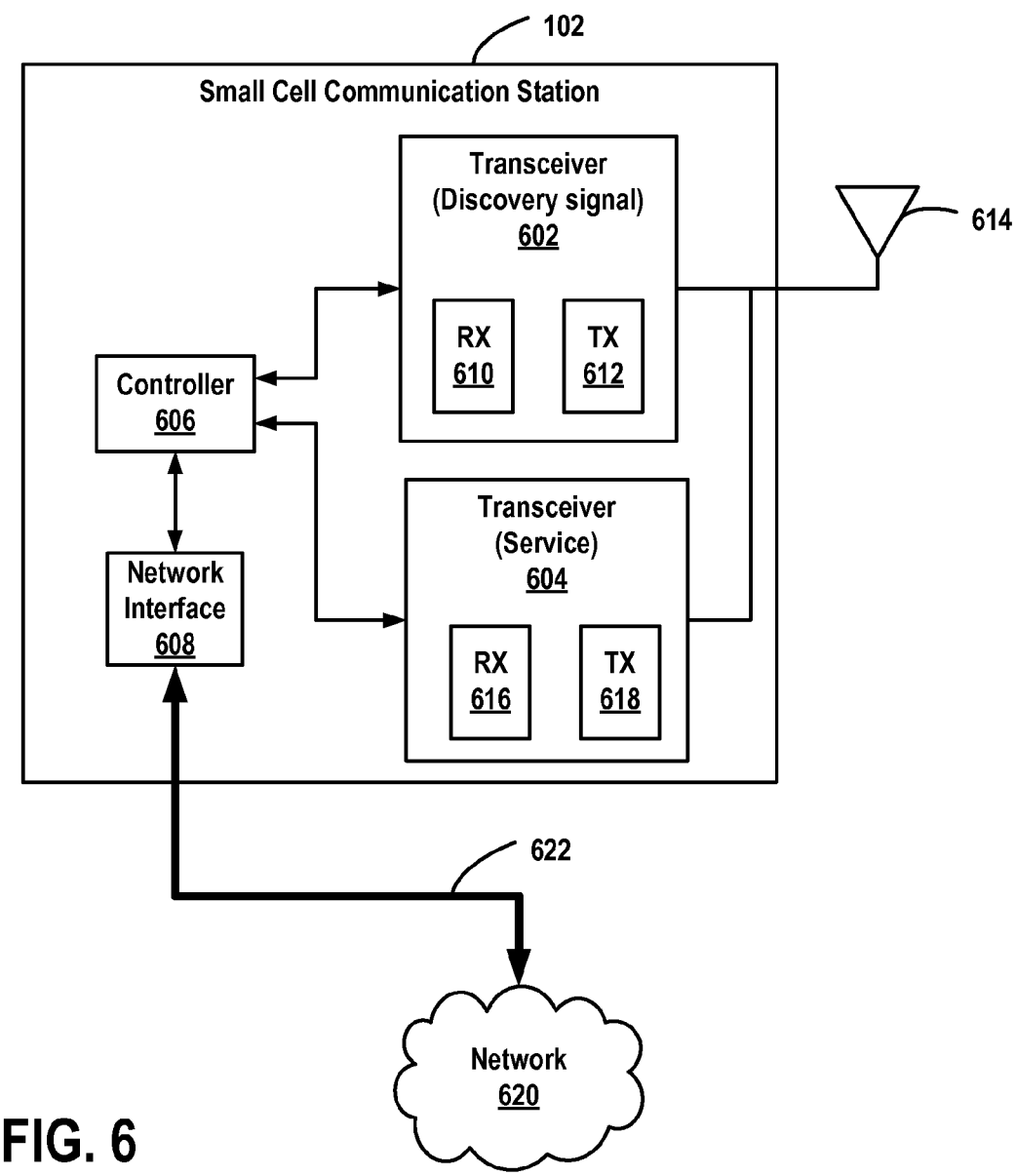
FIG. 6 is a block diagram of an example of a small cell communication station.

FIG. 6 is a block diagram of an example of a small cell communication station 104. The various functions and operations of the blocks described with reference to FIG. 6 may be implemented in any number of devices, circuits, and/or elements as well as with various forms of executable code such as software and firmware. Two or more of the functional blocks of FIG. 6 may be integrated in a single device and the functions described as performed in any single device may be implemented over several devices. For example, at least portions of the functions of the transceivers may be performed by the controllers or by elements common to both transceivers.

The small cell communication station 104 includes at least a discovery signal transceiver 602, a service transceiver 604, a controller 606, and a communication interface 608. The discovery transceiver 602 includes a receiver 610 and a transmitter 612 configured to receive D2D discovery signals 214 and to transmit small cell discovery signals 216, respectively, through an antenna 614. For the example herein, the transceiver 602 operates to receive and transmit over the macrocell communication station frequency carrier (F2). The antenna 614 may include multiple antennas, multiple elements, and/or sectors. The service transceiver 604 includes a receiver 616 and a transmitter 618 configured to receive uplink signals 124 and to transmit downlink signals 122, respectively, through the antenna 614. For the present example, the transceiver 604 operates to receive and transmit over the small cell communication station frequency carrier (F3). In some circumstances, different antennas can be used for the two transceivers 602, 604. This may be the case, for example, where discovery signals are transmitted within a frequency band significantly different from the frequency band of the uplink and downlink signals The controller 606 is any controller, processor, processing circuit, or processor arrangement that manages the functions described herein as well as facilitating the overall functionality of the small cell communication station 104. The transmitter 616 and receiver 618 transmit uplink and downlink signals to provide wireless service to UE devices within the small cell service area 114.

The communication interface 608 facilitates communication with and through a network 620 and may support communication over an X2 link in some circumstances. The communication interface communicates by sending and receiving signals through a backhaul 622. For the description herein, the small cell communication stations are fixed transceiver stations connected to a backhaul 620. Although the small cell communication stations may be moved to different locations, the communication stations are generally stationary while providing service. Therefore, the small cell communication stations differ from mobile D2D UE devices in at least that the stations are connected to a backhaul 622 and generally are not moved and remain fixed to provide service in the particular service area.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A cellular communication system comprising:
a macrocell communication station providing wireless service within a macrocell service area in accordance with a communication specification; and
a small cell communication station providing wireless service within a small cell service area and connected to a core network through a backhaul, the small cell service area at least partially overlapping the macrocell service area;
the communication specification defining frames and subframes of time-frequency communication resources for wireless communication between the macrocell communication station and mobile user equipment (UE) devices and between mobile device-to-device (D2D) UE devices, the communication specification allocating a discovery subframe for transmission of D2D discovery signals from mobile UE devices for detection by at least other mobile UE device, the small cell communication station configured to transmit small cell discovery signals within the discovery subframe, the small cell discovery signals received by at least one mobile UE device when the at least one mobile UE device is sufficiently close to the small cell communication station.

2. The cellular communication system of claim 1, wherein the small cell communication station transmits the small cell discovery signal regardless of whether a D2D discovery signal is detected by the small cell communication station.

3. The cellular communication system of claim 2, wherein the small cell communication station refrains from transmitting synchronization reference signals comprising one or more of a Primary Synchronization Signals (PSS), Secondary Synchronization Signals (SSS), and Cell Specific Reference Signal (CRS).

4. The cellular communication system of claim 3, wherein the small cell communication station transmits one of more of the synchronization reference signals in response to detecting a D2D discovery signal.

5. The cellular communication system of claim 1, wherein the small cell communication station is configured to receive a D2D discovery signal transmitted by the at least one mobile UE device.

6. The cellular communication system of claim 5, wherein the small cell communication station, at least partially in response to receiving the D2D discovery signal, sends a message to the macrocell communication station, the message identifying the at least one mobile UE device.

7. The cellular communication system of claim 5, wherein the small cell communication station is configured to transmit the small cell discovery signal within a current discovery subframe at least partially in response to receiving a D2D discovery signal transmitted by the at least one mobile small cell UE device in a prior discovery subframe.

8. The cellular communication system of claim 1, wherein the communication specification is a Third-Generation Partnership Project Long-Term Evolution (3GPP LTE) communication specification.

9. The cellular communication system of claim 1, wherein the communication specification allocates a macrocell downlink frequency for transmission of signals from the macrocell communication station and allocates a macrocell uplink frequency for reception of macrocell uplink signals transmitted from mobile devices, the at least one subframe allocated on the macrocell uplink frequency.

10. The cellular communication system of claim 9, wherein the communication specification allocates the macrocell uplink frequency for D2D communication.

11. The cellular communication system of claim 1, wherein the discovery subframe comprises:
a first time slot allocated for transmission of small cell discovery signals; and
a second time slot allocated for transmission of D2D discovery signals.

12. The cellular communication system of claim 1, wherein the discovery subframe comprises:

a first portion of symbol periods assigned to a first group of mobile D2D UE devices for transmission of a first group of D2D discovery signals; and
a second portion of symbol periods assigned to a second group of mobile D2D UE devices for transmission of a second group of D2D discovery signals.

13. A small cell communication station comprising:
a network interface configured to communicate with a core network through a backhaul;
a service transceiver configured to transmit downlink signals and receive uplink signals to provide wireless service within a small cell service area to mobile user equipment (UE) devices that have the capability to communicate with a macrocell communication station when the UE devices are within a macrocell service area, the macrocell communication station providing wireless service within the macrocell service area in accordance with a communication specification, the small cell service area at least partially overlapping the macrocell service area;
the communication specification defining frames and subframes of time-frequency communication resources for wireless communication between the macrocell communication station and the mobile user equipment (UE) devices, between the small cell communication station and mobile devices and between mobile device-to-device (D2D) UE devices;
the communication specification allocating a discovery subframe for transmission of D2D discovery signals;
a discovery signal receiver configured to receive D2D discovery signals from a mobile UE device that is sufficiently close to the small cell communication station; and
a discovery signal transmitter configured to transmit small cell discovery signals within the discovery subframe, the small cell discovery signals received by the mobile UE device when the mobile UE device is sufficiently close to the small cell communication station.

14. The small cell communication station of claim 13, wherein the network interface is configured to send, at least partially in response to the discovery signal receiver receiving the D2D discovery signal, a message to the macrocell communication station, the message identifying a mobile UE device that transmitted the D2D discovery signal.

15. The small cell communication station of claim 14, wherein the message identifies the mobile UE device to the macrocell communication station with information reflective of at least one of the UE ID and the C-RNTI.

16. The small cell communication station of claim 13, wherein the discovery signal transmitter is configured to transmit the small cell discovery signal within a current discovery subframe at least partially in response to the discovery signal receiver receiving the D2D discovery signal transmitted by the mobile UE device in a prior discovery subframe.

17. The small cell communication station of claim 13, wherein the communication specification is a Third-Generation Partnership Project Long-Term Evolution (3GPP LTE) communication specification.

18. The cell communication station of claim 13, wherein the communication specification allocates a macrocell downlink frequency for transmission of signals from the macrocell communication station and allocates a macrocell uplink frequency for reception of macrocell uplink signals transmitted from mobile devices, the at least one subframe allocated on the macrocell uplink frequency.

19. The cell communication station of claim 18, wherein the communication specification allocates the macrocell uplink frequency for D2D communication.

20. The small cell communication station of claim 13, wherein the discovery subframe comprises:
- a first time slot allocated for transmission of small cell discovery signals; and
- a second time slot allocated for transmission of D2D discovery signals.

21. The small cell communication station of claim 13, wherein the discovery subframe comprises:
- a first portion of symbol periods assigned to a first group of mobile D2D UEs for transmission of a first group of D2D discovery signals; and
- a second portion of symbol periods assigned to a second group of mobile D2D UE devices for transmission of a second group of D2D discovery signals.

22. The small cell communication station of claim 13, wherein the service transceiver is configured to decrease, in response to detection of the D2D discovery signal, a transmission period of synchronization reference signals.

* * * * *